US012625033B2

(12) United States Patent
Kojima et al.

(10) Patent No.: US 12,625,033 B2
(45) Date of Patent: May 12, 2026

(54) ABNORMALITY DETECTION SYSTEM FOR COMBUSTOR FOR GAS TURBINE, COMBUSTOR FOR GAS TURBINE AND GAS TURBINE, AND ABNORMALITY DETECTION METHOD FOR COMBUSTOR FOR GAS TURBINE

(71) Applicant: MITSUBISHI HEAVY INDUSTRIES, LTD., Tokyo (JP)

(72) Inventors: Tomoyuki Kojima, Kanagawa (JP); Susumu Sekine, Kanagawa (JP); Kozo Toyama, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 375 days.

(21) Appl. No.: 18/277,630

(22) PCT Filed: Mar. 11, 2022

(86) PCT No.: PCT/JP2022/010821
§ 371 (c)(1),
(2) Date: Aug. 17, 2023

(87) PCT Pub. No.: WO2022/196552
PCT Pub. Date: Sep. 22, 2022

(65) Prior Publication Data
US 2024/0133771 A1 Apr. 25, 2024
US 2024/0230471 A9 Jul. 11, 2024

(30) Foreign Application Priority Data
Mar. 19, 2021 (JP) ................................. 2021-045354

(51) Int. Cl.
*G01M 15/14* (2006.01)
*F02C 7/00* (2006.01)

(52) U.S. Cl.
CPC ............... *G01M 15/14* (2013.01); *F02C 7/00* (2013.01); *F05D 2260/80* (2013.01)

(58) Field of Classification Search
CPC .................................................... G01M 15/14
See application file for complete search history.

(56) References Cited

U.S. PATENT DOCUMENTS

2015/0007713 A1 1/2015 Aki

FOREIGN PATENT DOCUMENTS

CN 104280243 A 1/2015
DE 102014109436 A1 1/2015
(Continued)

OTHER PUBLICATIONS

Office Action issued Sep. 11, 2025 in corresponding German application No. 112022000623.4, with English machine translation.
(Continued)

*Primary Examiner* — Eric S. McCall
(74) *Attorney, Agent, or Firm* — Wenderoth, Lind & Ponack, L.L.P.

(57) ABSTRACT

An abnormality detection system for a combustor for a gas turbine, includes: a sensor for detecting whether an ignition plug is located at an insertion position in a combustion tube of the combustor, the ignition plug being disposed movably between the insertion position and a retracted position retracted from the combustion tube; and a diagnostic unit configured to diagnose an abnormality in an ignition device including the ignition plug, based on a detection result by the sensor.

24 Claims, 8 Drawing Sheets

(56)  References Cited

FOREIGN PATENT DOCUMENTS

| JP | 4-50436 | 2/1992 |
| JP | 2000-18051 | 1/2000 |
| JP | 2008-530411 | 8/2008 |
| JP | 2015-14990 | 1/2015 |
| WO | 2006/081675 | 8/2006 |
| WO | 2020/105335 | 5/2020 |

OTHER PUBLICATIONS

Translation of the International Search Report issued May 31, 2022 in corresponding International Application No. PCT/JP2022/010821.
Translation of the International Preliminary Report on Patentability issued Sep. 28, 2023 in corresponding International Application No. PCT/JP2022/010821.
Office Action issued Aug. 21, 2025 in corresponding CN application No. 202280021026.7, with English machine translation.

RADIAL DIRECTION

AXIAL DIRECTION

ABNORMALITY DETECTION SYSTEM FOR COMBUSTOR FOR GAS TURBINE, COMBUSTOR FOR GAS TURBINE AND GAS TURBINE, AND ABNORMALITY DETECTION METHOD FOR COMBUSTOR FOR GAS TURBINE

CROSS-REFERENCE TO RELATED APPLICATION

This application claims priority from Japanese Patent Application No. 2021-045354 filed on Mar. 19, 2021, the content of which is incorporated herein by reference.

TECHNICAL FIELD

The present disclosure relates to an abnormality detection system for a combustor for a gas turbine, the combustor and the gas turbine, and an abnormality detection method for the combustor.

BACKGROUND

In a combustor for a gas turbine, fuel is ignited with an ignition plug.

JP 2000-18051 A discloses a gas turbine combustor which is provided with an ignition plug disposed movable back and forth between a position inside a combustion tube and a position outside the combustion tube. In this combustor, when the ignition plug is located at the position inside the combustion tube, the ignition plug generates an ignition spark to ignite fuel supplied to the combustor.

SUMMARY

Technical Problem

Meanwhile, in the ignition plug disposed movable back and forth in the combustion tube as described above, if the ignition plug cannot move to an insertion position (ignition position) in the combustion tube for some reason, the fuel cannot be ignited, making it impossible to properly start a gas turbine. In such a case, if the cause of the start-up failure is unknown, the restart and the ignition failure of the gas turbine may wastefully be repeated.

In view of the above, an object of at least one embodiment of the present invention is to provide an abnormality detection system for a combustor for a gas turbine, the combustor for the gas turbine and the gas turbine, and an abnormality detection method for the combustor for the gas turbine, which are capable of appropriately detecting an abnormality in an ignition device including an ignition plug.

Solution to Problem

An abnormality detection system for a combustor for a gas turbine according to at least one embodiment of the present invention, includes: a sensor for detecting whether an ignition plug is located at an insertion position in a combustion tube of the combustor for the gas turbine, the ignition plug being disposed movably between the insertion position and a retracted position retracted from the combustion tube; and a diagnostic unit configured to diagnose an abnormality in an ignition device including the ignition plug, based on a detection result by the sensor.

Further, a combustor for a gas turbine according to at least one embodiment of the present invention, includes: a fuel nozzle for injecting fuel; an ignition device that includes an ignition plug configured to ignite the fuel injected from the fuel nozzle; and the above-described abnormality detection system configured to diagnose an abnormality in the ignition device.

Furthermore, a gas turbine according to at least one embodiment of the present invention, includes the above-described combustor; and a turbine configured to be driven by a combustion gas generated in the combustor.

Furthermore, an abnormality detection method for a combustor for a gas turbine according to at least one embodiment of the present invention, includes: a detection step of detecting whether an ignition plug is located at an insertion position in a combustion tube of the combustor for the gas turbine, the ignition plug being disposed movably between the insertion position and a retracted position retracted from the combustion tube; and a step of diagnosing an abnormality in an ignition device including the ignition plug, based on a detection result in the detection step.

Advantageous Effects

According to at least one embodiment of the present invention, an abnormality detection system for a combustor for a gas turbine, the combustor for the gas turbine and the gas turbine, and an abnormality detection method for the combustor for the gas turbine are provided which are capable of appropriately detecting an abnormality in an ignition device including an ignition plug.

DETAILED DESCRIPTION

Figure 1:
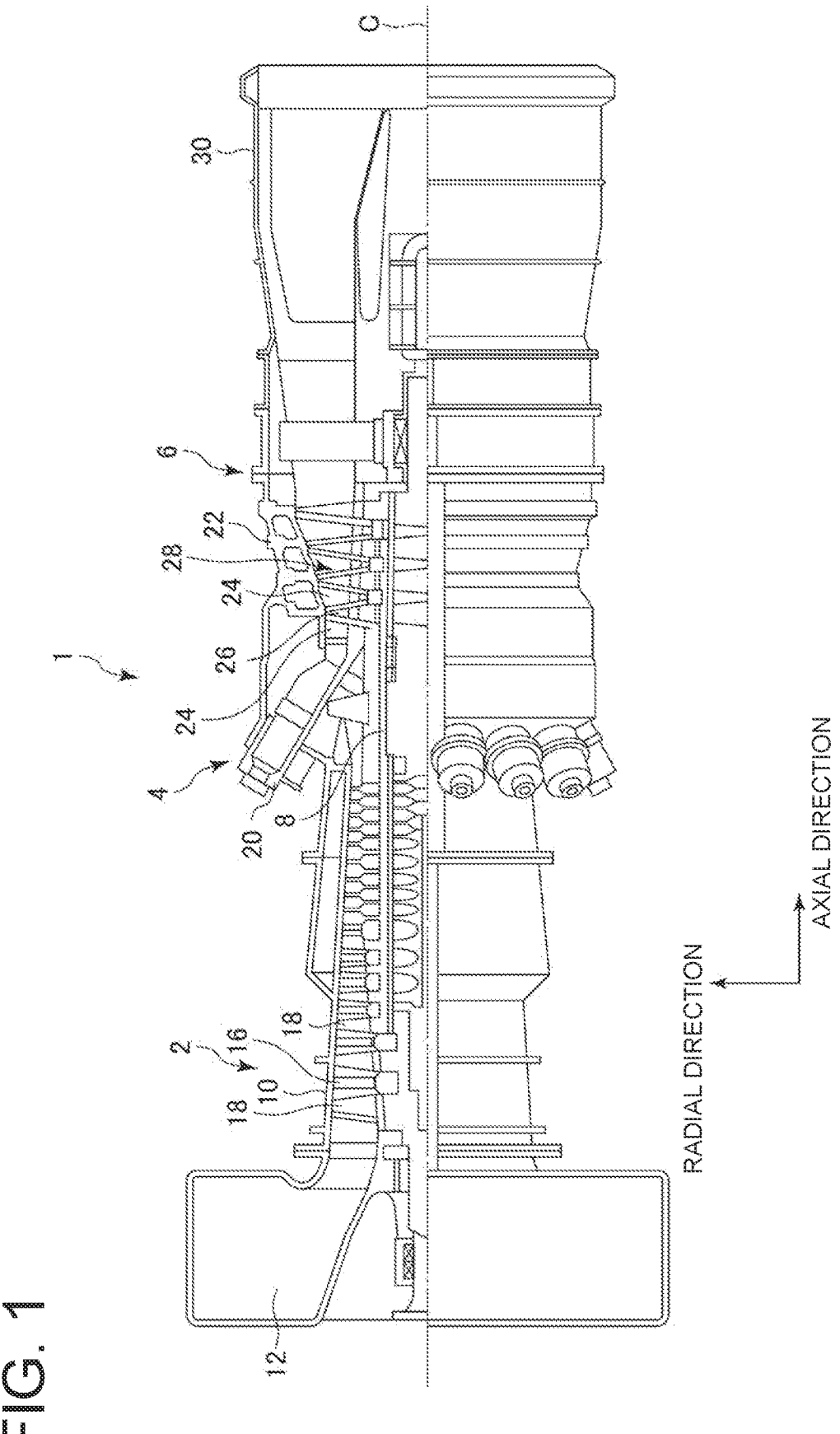
FIG. 1 is a schematic configuration view of a gas turbine according to an embodiment.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.
(Configuration of Gas Turbine)

Figure 2:
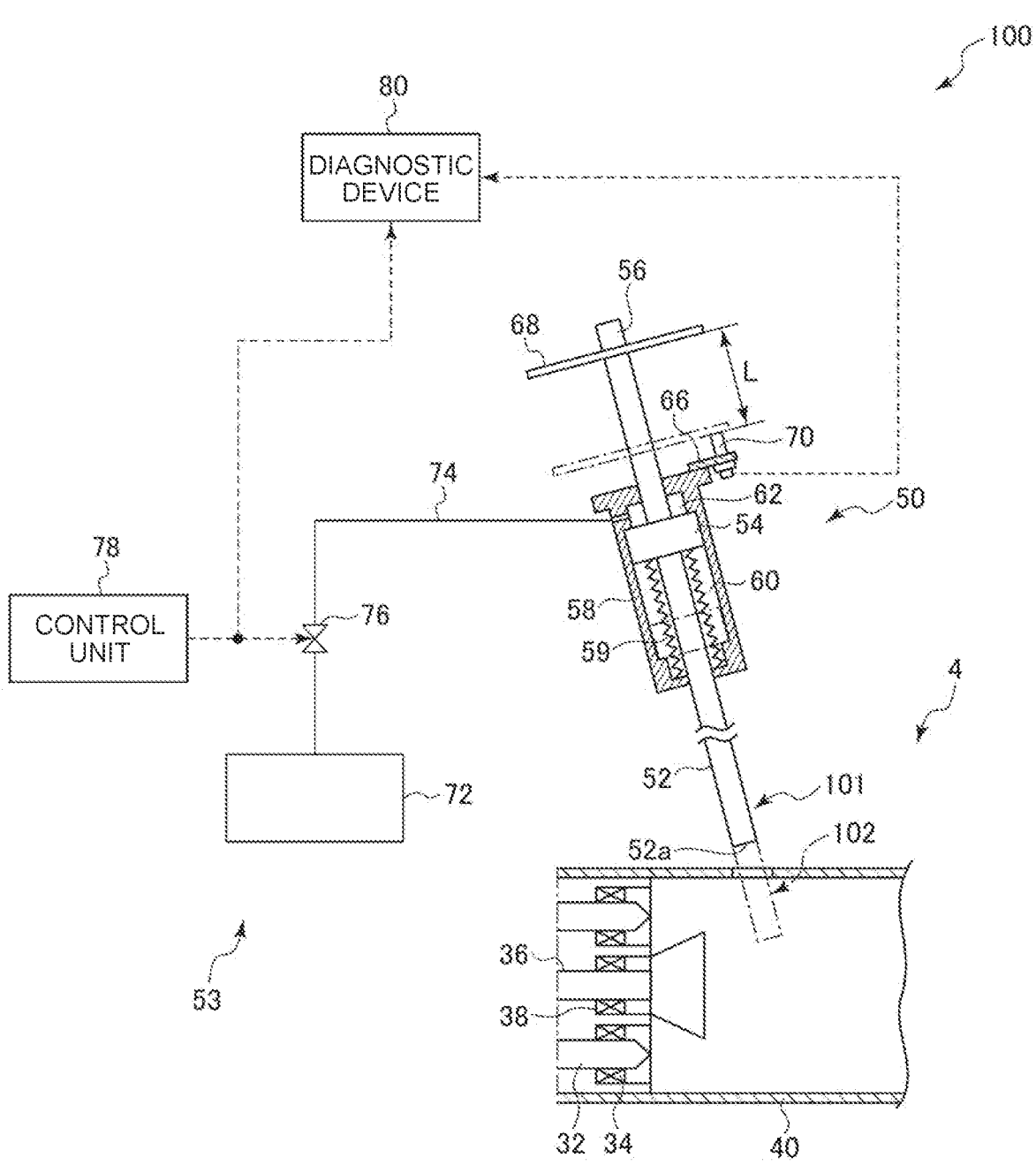
FIG. 2 is a schematic configuration view of a combustor according to an embodiment.

FIG. 1 is a schematic configuration view showing an example of a gas turbine including a combustor to be diagnosed by an abnormality detection system according to some embodiments. FIG. 2 is a schematic configuration diagram of the combustor to be diagnosed by the abnormality detection system according to an embodiment.

As shown in FIG. 1, a gas turbine 1 includes a compressor 2 for generating compressed air, a combustor 4 for generating a combustion gas from the compressed air and fuel, and a turbine 6 configured to be rotationally driven by the combustion gas. In the case of the gas turbine 1 for power generation, a generator (not shown) is connected to the turbine 6.

The compressor 2 includes a plurality of stator vanes 16 fixed to the side of a compressor casing 10 and a plurality of rotor blades 18 implanted on a rotor 8 so as to be arranged alternately with respect to the stator vanes 16. Intake air from an air inlet 12 is sent to the compressor 2, and passes through the plurality of stator vanes 16 and the plurality of rotor blades 18 to be compressed, turning into compressed air having a high temperature and a high pressure.

The combustor 4 is supplied with fuel and the compressed air generated in the compressor 2. The combustor 4 burns the fuel to produce a combustion gas that serves as a working fluid of the turbine 6. As shown in FIG. 1, the gas turbine 1 includes the plurality of combustors 4 which are disposed in a casing 20 along the circumferential direction centering around the rotor 8 (rotor axis C).

The turbine 6 includes a combustion gas passage 28 formed by a turbine casing 22, and includes a plurality of stator vanes 24 and rotor blades 26 disposed in the combustion gas passage 28. Each of the stator vanes 24 is fixed to the side of the turbine casing 22. The plurality of stator vanes 24 arranged along the circumferential direction of the rotor 8 form stator vane rows. Moreover, each of the rotor blades 26 is implanted on the rotor 8. The plurality of rotor blades 26 arranged along the circumferential direction of the rotor 8 form rotor blade rows. The stator vane rows and the rotor blade rows are alternately arranged in the axial direction of the rotor 8.

In the turbine 6, the combustion gas having flowed into the combustion gas passage 28 from the combustor 4 passes through the plurality of stator vanes 24 and the plurality of rotor blades 26, thereby driving the rotor 8 rotationally about the rotor axis C. Consequently, the generator connected to the rotor 8 is driven to generate power. The combustion gas having driven the turbine 6 is discharged to the outside via an exhaust hood 30.

As shown in FIG. 2, at least any of the plurality of combustors 4 includes a combustion tube 40 disposed in the casing 20 (see FIG. 1), a first nozzle 32 (fuel nozzle) and a second nozzle 36 (fuel nozzle) disposed in the combustion tube 40, and an ignition device 50.

Each of the first nozzle 32 and the second nozzle 36 is configured to be supplied with fuel from a combustion port (not shown) and configured to inject the fuel into the combustion tube 40. Swirlers 34, 38 are disposed around the first nozzle 32 and the second nozzle 36, and the compressed air from the compressor 2 (see FIG. 1) is supplied into the combustion tube 40 via the swirlers 34, 38. The fuel injected from the first nozzle 32 and the second nozzle 36 and the air supplied via the swirlers 34, 38 form a mixture of the fuel and the air in the combustion tube 40.

The ignition device 50 is configured to ignite a mixer containing the fuel injected from the first nozzle 32 and/or the second nozzle 36. The ignition device 50 includes an ignition plug 52, a drive part 53 for driving the ignition plug 52, and a control unit 78 for controlling the driving of the ignition plug 52 by the drive part 53.

The ignition plug 52 has a leading end portion 52a configured to generate a spark. The ignition plug 52 is driven by the drive part 53 to be movable along the axial direction of the ignition plug 52 and between an insertion position 102 in the combustion tube 40 and a retracted position 101 retracted from the combustion tube 40. The axial direction of the ignition plug 52 is a direction intersecting the axial direction of the combustion tube 40 (substantially the same direction as the axial direction of the first nozzle 32 or the second nozzle 36).

The insertion position 102 is a specific position of the ignition plug 52, where at least the leading end portion 52a of the ignition plug 52 is located inside the combustion tube 40. When the ignition plug 52 is located at the insertion position 102, a spark is generated in the leading end portion 52a of the ignition plug 52 and the spark ignites the mixer in the combustion tube 40.

Typically, the insertion position 102 is a position where the ignition plug 52 is most inserted into the combustion tube 40. Typically, the retracted position is a position where the ignition plug 52 is most retracted from the combustion tube 40. The leading end portion 52a of the ignition plug 52 may be positioned outside the combustion tube 40 when the ignition plug 52 is located at the retracted position.

The drive part 53 is configured to move the ignition plug 52 between the insertion position 102 and the retracted position 101. In the exemplary embodiment shown in FIG. 2, the drive part 53 is configured to pneumatically drive the ignition plug 52.

The drive part 53 shown in FIG. 2 includes a cylinder 58 extending along the axial direction of the ignition plug 52, and a piston 54 which is connected to the ignition plug 52 and is slidable in the cylinder 58 along the axial direction of the cylinder 58. An inner wall surface of the cylinder 58 and the piston 54 form a first chamber 60 on the ignition plug 52 side and a second chamber 62 on a side opposite to the first chamber 60. The cylinder 58 is supported by a stationary part such as the casing 20 of the combustor 4.

The drive part 53 includes an air source 72 in which air to be supplied to the cylinder 58 is stored, an air line 74 disposed between the air source 72 and the cylinder 58, and an air valve 76 disposed on the air line 74. The air from the air source 72 can be supplied to the second chamber 62 of the cylinder 58 via the air line 74, and the amount of the air supplied to the second chamber 62 can be adjusted by the air valve 76.

The drive part 53 includes a biasing member 59 for biasing the piston 54 in a direction from the first chamber 60 toward the second chamber in the axial direction of the cylinder 58. In the exemplary embodiment shown in FIG. 2, the biasing member 59 is a spring disposed in the first chamber 60.

The control unit 78 is configured to send an insertion command signal for positioning the ignition plug 52 at the insertion position 102 to the ignition device 50, at an ignition timing of the gas turbine 1. In the exemplary embodiment shown in FIG. 2, an insertion command signal indicating an opening degree of the air valve 76 is sent from the control unit 78 to the air valve 76.

The ignition device 50 having the above configuration operates as described below. The ignition plug 52 is normally located at the retracted position 101. If the insertion command signal is sent from the control unit 78 while the ignition plug 52 is located at the retracted position 101, the opening degree of the air valve 76 is adjusted by the insertion command signal, and the air from the air source 72 is supplied to the second chamber 62 of the cylinder 58 via the air line 74. An air pressure in the second chamber acting on the piston 54 overcomes a biasing force of the biasing member 59 and moves the piston 54 in a direction from the second chamber 62 toward the first chamber 60. At this time, the air in the first chamber 60 is released to the outside via a release part (not shown). Along there with, the ignition plug 52 moves from the retracted position 101 to the insertion position 102.

On the other hand, if the control unit 78 stops sending the insertion command signal while the ignition plug 52 is located at the insertion position 102, the air valve 76 is closed and the supply of air from the air source 72 to the second chamber 62 is stopped. The biasing force of the biasing member 59 acting on the piston 54 moves the piston in a direction from the first chamber 60 toward the second chamber 62. At this time, the air in the second chamber 62 is released to the outside via the release part (not shown). Along therewith, the ignition plug 52 moves from the insertion position 102 to the retracted position 101.

(Configuration of Abnormality Detection System)

Figure 3:
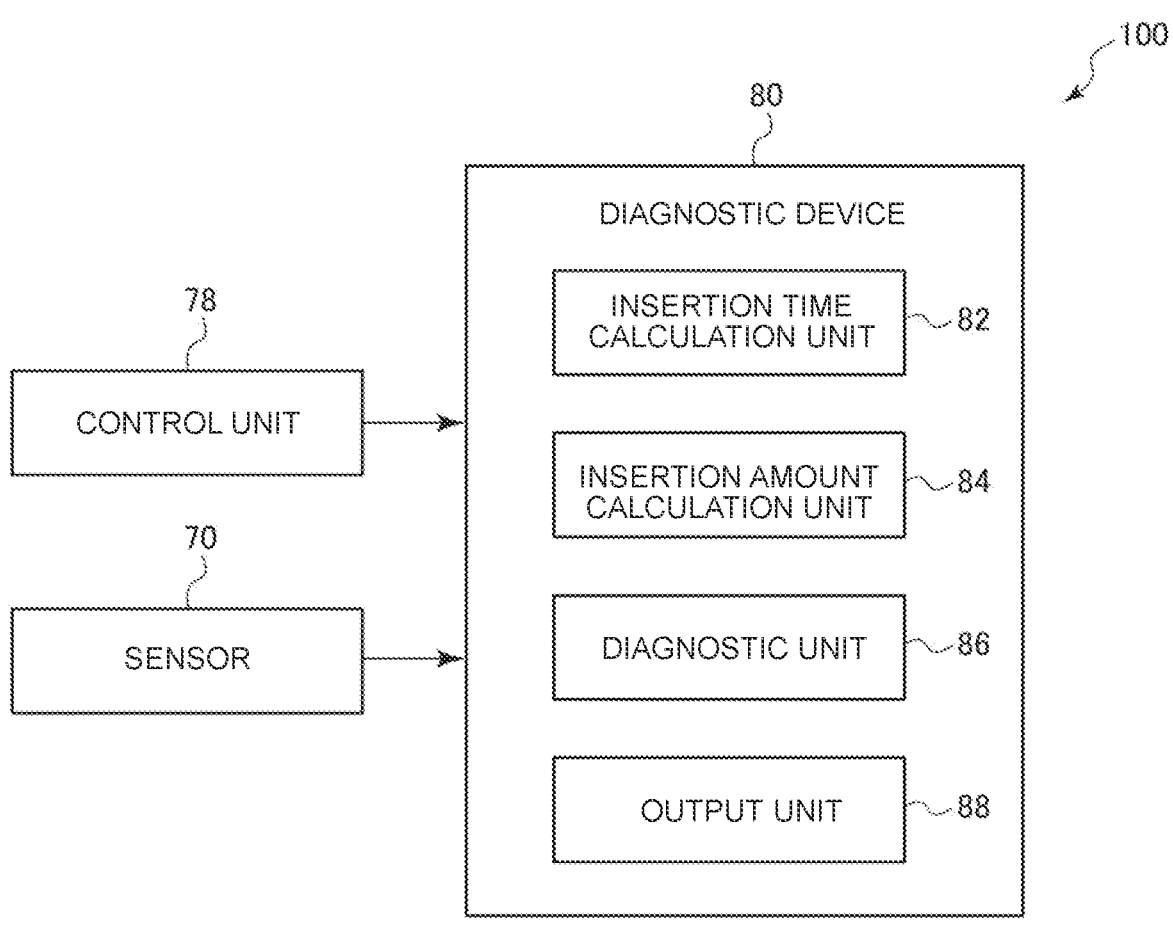
FIG. 3 is a schematic configuration diagram of an abnormality diagnosis system according to an embodiment.

FIG. 3 is a schematic configuration diagram of an abnormality diagnosis system according to an embodiment. As shown in FIGS. 2 and 3, an abnormality detection system 100 includes a sensor 70 for detecting whether the ignition plug 52 is located at the insertion position 102, and a diagnostic device 80 which includes a diagnostic unit 86 configured to diagnose the abnormality in the ignition device 50 based on a detection result by the sensor 70.

In the exemplary embodiment shown in FIG. 2, the sensor 70 is supported by the cylinder 58 via a mounting part 66. Further, a movable part 68 moving along the axial direction of the ignition plug 52 together with the ignition plug 52 is disposed so as to face the sensor 70. The movable part 68 shown in FIG. 2 is a flange part which is attached to a rod 56 connected to the piston 54 on a side opposite to the ignition plug 52.

In some embodiments, the sensor 70 is a sensor capable of only detecting whether the ignition plug 52 is located at the insertion position 102. In this case, the sensor 70 may be configured to send an ON signal to the diagnostic device 80 only when the ignition plug 52 is located at the insertion position 102. The sensor 70 may be a contact sensor (for example, a limit sensor). In this case, the sensor 70 may be configured to send the above-described ON signal to the diagnostic device 80 when the sensor 70 and the movable part 68 contact each other. Alternatively, the sensor 70 may be a non-contact sensor (for example, an eddy current sensor). In this case, the sensor 70 may be configured to send the above-described ON signal to the diagnostic device 80 when the sensor 70 and the movable part 68 come close to a predetermined distance.

In some embodiments, the sensor 70 is a sensor capable of detecting a displacement amount of the ignition plug 52 in a moving direction of the ignition plug 52 (a direction along the axial direction of the ignition plug 52). In this case, the sensor 70 may be configured to detect a distance L between the sensor 70 and the movable part 68 in the axial direction of the ignition plug 52, and to send a signal indicating the detected distance to the diagnostic device 80.

The diagnostic device 80 is configured to receive and process a signal indicating a detection result of the position of the ignition plug 52 from the sensor 70 and/or the insertion command signal from the control unit 78. As shown in FIG. 3, the diagnostic device 80 may include at least one of an insertion time calculation unit 82, an insertion amount calculation unit 84, or an output unit 88, in addition to the diagnostic unit 86.

The insertion time calculation unit 82 is configured to calculate an insertion time from a start of insertion of the ignition plug 52 located at the retracted position 101 until the ignition plug 52 reaches the insertion position 102, based on the detection result by the sensor 70. In the ignition device 50, when an abnormality such as sticking of the cylinder 58 or a decrease in air pressure occurs, the insertion time from the start of the insertion of the ignition plug 52 to the completion of the insertion tends to increase. Therefore, the abnormality in the ignition device 50 can be detected based on the insertion time of the ignition plug 52.

Figure 4:
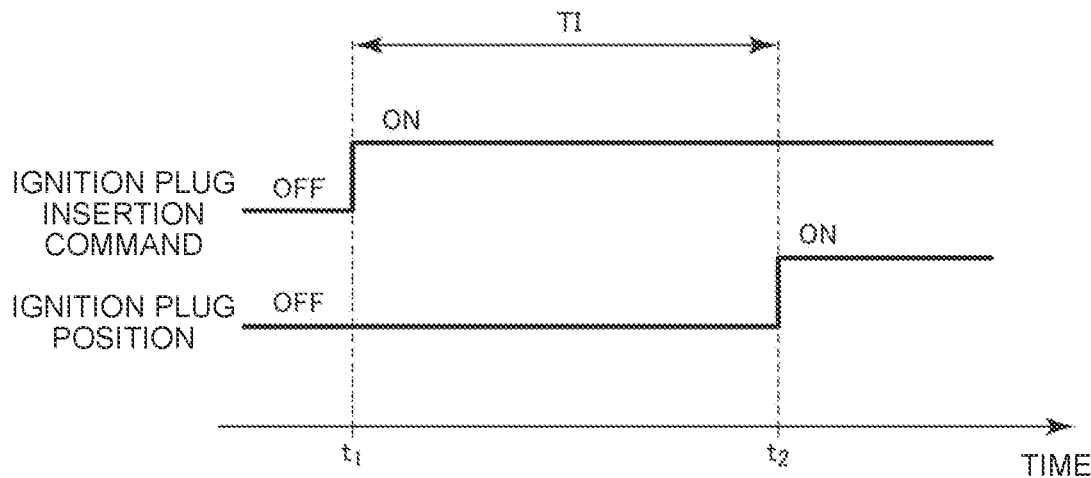
FIG. 4 is an example of a time chart of an insertion command signal and a signal indicating a position of an ignition plug.

The insertion time calculation unit 82 may calculate, as the above-described insertion time, a length of time TI from time t1 (see FIG. 4) when an insertion start signal is received from the control unit 78 to time t2 (see FIG. 4) when the signal indicating that the sensor 70 is located at the insertion position 102 is received. FIG. 4 is an example of a time chart of the insertion command signal and the signal indicating the position of the ignition plug 52 which are received by the diagnostic device 80. As to the signal indicating the position of the ignition plug 52, OFF indicates that the ignition plug 52 is located at the retracted position 101 and ON indicates that the ignition plug 52 is located at the insertion position 102.

The insertion amount calculation unit 84 is configured to calculate the insertion amount of the ignition plug 52 based on the detection result by the sensor 70. In the ignition device 50, when the abnormality such as sticking of the cylinder 58 or the decrease in air pressure occurs, the insertion amount of the ignition plug 52 tends to decrease. Therefore, the abnormality in the ignition device 50 can be detected based on the insertion amount of the ignition plug 52.

The insertion amount calculation unit 84 may calculate, based on the distance L (see FIG. 2) between the sensor 70 and the movable part 68 after when the insertion start signal from the control unit 78 is received, a difference between the above-described distance L when the insertion start signal from the control unit 78 is received and a minimum value of the distance L (the distance L when the sensor 70 and the movable part 68 are closest to each other), as the insertion amount of the ignition plug 52.

The diagnostic unit 86 may be configured to diagnose the abnormality in the ignition device 50 based on the insertion time calculated by the insertion time calculation unit 82 or the insertion amount calculated by the insertion amount calculation unit 84.

The output unit 88 is configured to output the diagnostic result by the diagnostic unit 86. Alternatively, the output unit 88 may be configured to output an alarm when the diagnostic unit 86 determines that the ignition device 50 has the abnormality. The output unit 88 may include a device (such as a display or a loudspeaker) configured to output the diagnosis result by the diagnostic unit 86 or the above-described alarm as visual information or auditory information.

The diagnostic device 80 may include a calculator with a processor (such as CPU), a storage device (memory device; such as RAM), an auxiliary storage unit, an interface, and the like. The diagnostic device 80 is configured to receive the signals from the sensor 70 and/or the control unit 78 via the interface. The processor is configured to process the signal thus received. In addition, the processor is configured to process programs loaded into the storage device. Whereby, the function of each functional unit (the diagnostic unit 86, the insertion time calculation unit 82, the insertion amount calculation unit 84, or the output unit 88) described above is realized.

The processing contents in the diagnostic device 80 may be implemented as programs executed by the processor. The programs may be stored in the auxiliary storage unit. When executed, these programs are loaded into the storage device. The processor reads out the programs from the storage device to execute instructions included in the programs.

In the ignition plug 52 disposed movable back and forth in the combustion tube 40, if the ignition plug 52 cannot move to the insertion position 102 (ignition position) in the combustion tube 40 for some reason (for example, fixing in the cylinder 58, a lack of air pressure to the cylinder 58, a failure in an air supply system, etc.), the fuel injected from the fuel nozzle cannot be ignited, making it impossible to properly start the gas turbine 1. In such a case, if the cause of the start-up failure is unknown, the restart and the ignition failure of the gas turbine 1 may wastefully be repeated.

In this respect, with the abnormality detection system 100 configured as described above, since the sensor 70 can detect whether the ignition plug 52 is located at the insertion position 102 in the combustion tube 40, the abnormality in the ignition device 50 can appropriately be diagnosed based on this detection result. Therefore, even if the abnormality in the ignition device 50 is detected, the abnormality can be addressed during or before the gas turbine 1 is started, making it possible to quickly start the gas turbine 1.

In some embodiments, the diagnostic unit 86 is configured to diagnose the abnormality in the ignition device 50 based on the detection result by the sensor 70, during the startup of the gas turbine 1 and before ignition of fuel in the combustor 4.

By thus diagnosing the abnormality in the ignition device 50 during the startup of the gas turbine 1 and before the ignition in the combustor 4, it becomes easier to grasp the cause of the start-up failure when the gas turbine 1 cannot be started. Thus, it is possible to effectively reduce the number of wasteful restarts of the gas turbine 1 associated with the ignition failure.

(Abnormality Detection Flow for Combustor for Gas Turbine)

Figure 5:
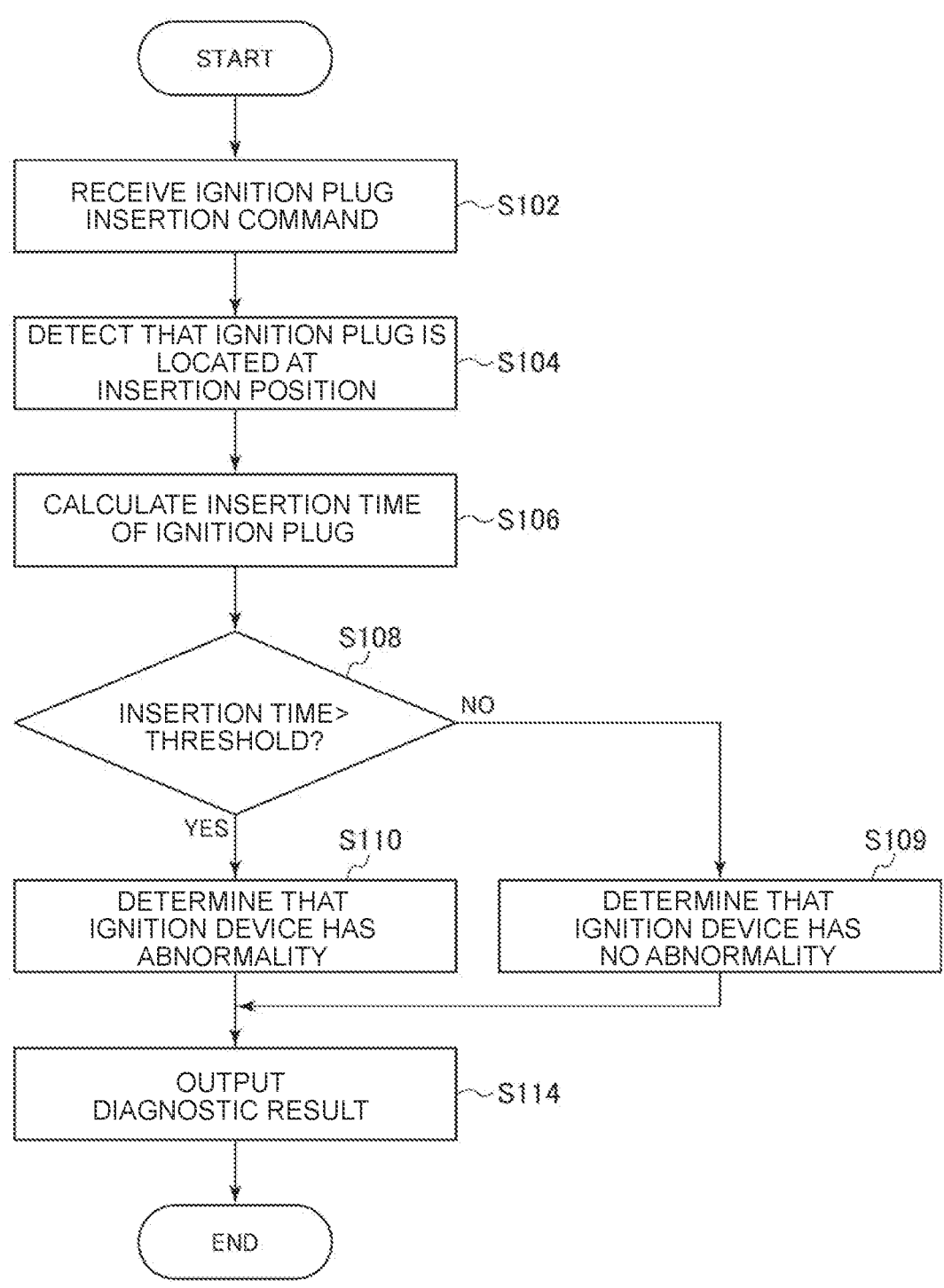
FIG. 5 is a flowchart showing an abnormality detection method for a combustor for the gas turbine according to an embodiment.
Figure 7:
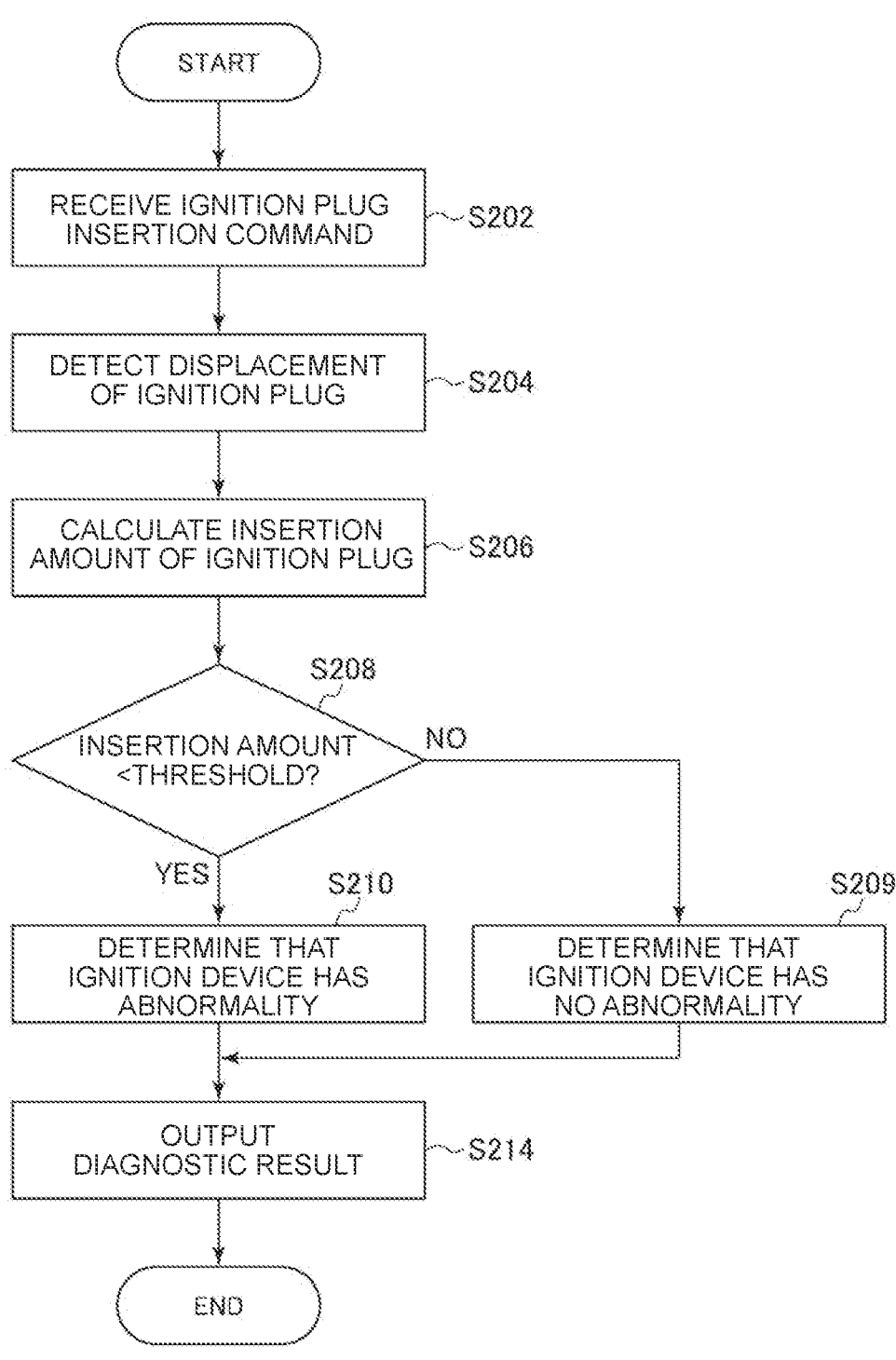
FIG. 7 is a flowchart showing the abnormality detection method for the combustor for the gas turbine according to an embodiment.
Figure 8:
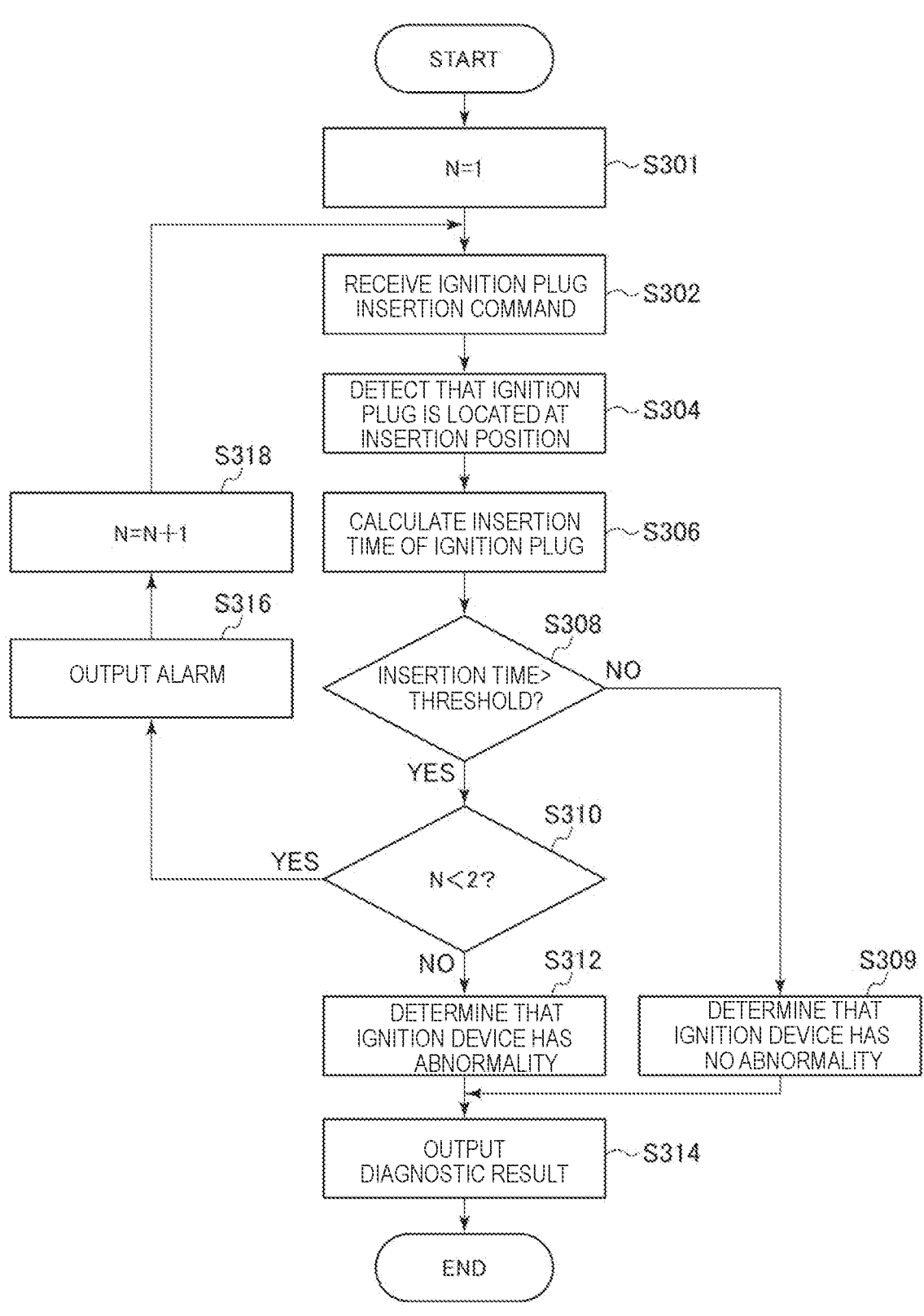
FIG. 8 is a flowchart showing the abnormality detection method for the combustor for the gas turbine according to an embodiment.

A flow of abnormality detection for the combustor 4 including the ignition device 50 will be described below. FIGS. 5, 7, 8 are each a flowchart showing the abnormality detection method for the combustor 4 for the gas turbine 1 according to an embodiment. Hereinafter, a case will be described where the abnormality detection method for the combustor according to an embodiment is performed by using the abnormality detection system 100 including the diagnostic device 80 described above. However, in some embodiments, the abnormality detection method for the combustor may be performed by using another device, or in some embodiments, some or all of procedures described below may be performed manually.

In the embodiment shown in FIG. 5, a sensor capable of only detecting whether the ignition plug 52 is located at the insertion position 102 or a sensor capable of detecting the displacement amount of the ignition plug 52 can be used as the sensor 70.

In the embodiment shown in FIG. 5, first, the control unit 78 sends the insertion command signal for the ignition plug 52 during the startup of the gas turbine 1 and before the ignition in the combustor 4. The insertion command signal thus sent is received by the diagnostic device 80 and the ignition device 50 (S102), The ignition plug 52 is located at the retracted position 101 until immediately before the insertion command signal is sent.

Upon receiving the insertion command signal in step S102, the ignition device 50 operates as described above and the ignition plug 52 moves from the retracted position 101 to the insertion position 102. If the sensor 70 detects that the ignition plug 52 is located at the insertion position 102, this detection signal is sent to the diagnostic device 80 (S104).

The insertion time calculation unit 82 calculates the insertion time TI (see FIG. 4) of the ignition plug 52 based on the insertion command signal received in step S102 and the signal from the sensor 70 received in step S104 (S106).

Next, the diagnostic unit 86 compares the insertion time TI calculated in step S106 with a threshold (S108). As a result of the comparison in step S108, when the insertion time TI is not greater than the threshold (No in S108), the diagnostic unit 86 determines that the ignition device 50 has no abnormality (S10). On the other hand, as the result of the comparison in step S108, when the insertion time TI is greater than the threshold (Yes in S108), the diagnostic unit 86 determines that the ignition device 50 has the abnormality (S110).

Next, the output unit 88 outputs the results obtained in steps S108 to S110 (S114). When it is determined in steps S108 to S110 that the ignition device 50 has the abnormality, the output unit 88 may output the alarm in step S114.

When it is determined, by performing the above-described procedure, that the ignition device 50 has no abnormality (step S109), the startup of the gas turbine 1 is completed. On the other hand, when it is determined, by performing the above-described procedure, that the ignition device 50 has the abnormality (step S110), a starting procedure for the gas turbine 1 is stopped to check the ignition device 50, and the starting procedure for the gas turbine 1 is restarted after the abnormality in the ignition device is removed.

Figure 6:
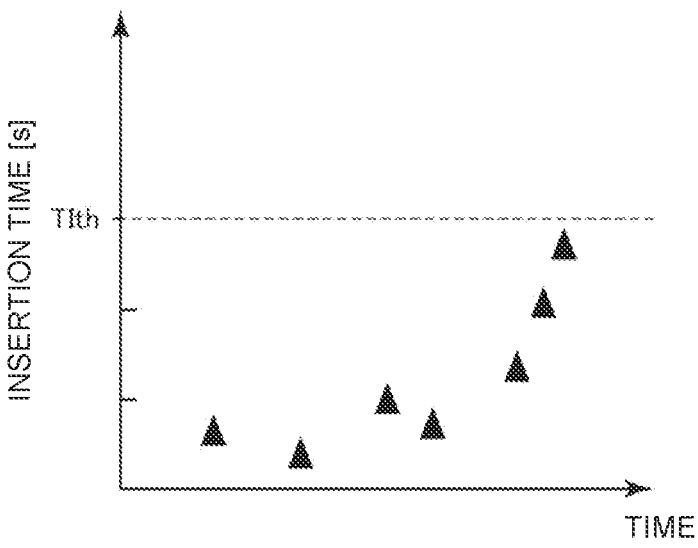
FIG. 6 is a graph showing an example of output results by a diagnostic device according to an embodiment.

The diagnostic device 80 may accumulate the calculated insertion time in a storage unit (an external storage device or an internal storage device) each time the insertion time is calculated in step S106. The output unit 88 may output a graph (see FIG. 6), which shows a temporal change in the insertion time accumulated in the storage unit, on a display unit such as a display. Further, the output unit 88 may output a threshold TIth (see FIG. 6), which is used in step S108, on the display unit, together with the insertion time calculated in step S106. FIG. 6 is a graph showing an example of output results by the output unit 88 (diagnostic device 80) according to an embodiment.

A trend of a change in feeling of insertion can easily be grasped by expressing the time change of the insertion time calculated in the past as the graph as described above. Therefore, for example, it is possible to estimate when the insertion time exceeds the threshold, and to efficiently perform maintenance or the like of the combustor 4.

In the embodiment shown in FIG. 7, the sensor capable of detecting the displacement amount of the ignition plug 52 can be used as the sensor 70.

In the embodiment shown in FIG. 7, in step S202, as with step S102 in the embodiment shown in FIG. 5, the diagnostic device 80 and the ignition device 50 receive the insertion command signal from the control unit 78 (S102).

Upon receiving the insertion command signal in step S202, the ignition device 50 operates as described above and the ignition plug 52 moves from the retracted position 101 to the insertion position 102. If the sensor 70 detects the displacement amount of the ignition plug 52, this detection signal is sent to the diagnostic device 80 (S204).

The insertion amount calculation unit 84 calculates the insertion amount of the ignition plug 52 based on the insertion command signal received in step S202 and the signal from the sensor 70 received in step S204 (S206).

Next, the diagnostic unit 86 compares the insertion amount calculated in step S206 with the threshold (S208). As a result of the comparison in step S208, when the insertion amount is more abnormal than the threshold (No in S208), the diagnostic unit 86 determines that the ignition device 50 has no abnormality (S209). On the other hand, as the result of the comparison in step S208, when the insertion amount is less than the threshold (Yes in S208), the diagnostic unit 86 determines that the ignition device 50 has the abnormality (S210).

Next, the output unit 88 outputs the results obtained in steps S208 to S210 (S214). When it is determined in steps S208 to S210 that the ignition device 50 has the abnormality, the output unit 88 may output the alarm in step S214.

When it is determined, by performing the above-described procedure, that the ignition device 50 has no abnormality (step S209), the startup of the gas turbine 1 is completed. On the other hand, when it is determined, by performing the above-described procedure, that the ignition device 50 has the abnormality (step S210), the starting procedure for the gas turbine 1 is stopped to check the ignition device 50, and the starting procedure for the gas turbine 1 is restarted after the abnormality in the ignition device is removed.

The embodiment shown in FIG. 8 is a modification of the embodiment shown in FIG. 5. In an embodiment, a similar modification of the embodiment shown in FIG. 7 may be performed.

In the embodiment shown in FIG. 8, first, the diagnostic device 80 sets a counter (i) to 1 (S301). Then, steps S302 to S306 are performed in the same procedure as steps S102 to S106 in the embodiment shown in FIG. 5 to calculate the insertion time of the ignition plug 52.

Next, the diagnostic unit 86 compares the insertion time TI calculated in step S306 with a threshold (S308). As a result of the comparison in step S308, when the insertion time TI is not greater than the threshold (No in S308), the diagnostic unit 86 determines that the ignition device 50 has no abnormality (S309), and the process proceeds to next step S314.

On the other hand, as the result of the comparison in step S308, when the insertion time TI is greater than the threshold (Yes in S308 and Yes in S310), it is possible to determine that the ignition device 50 may have the abnormality. Consequently, the output unit 88 outputs the alarm (S316), the counter (i) is incremented (S318), and the procedures in steps S302 to S308 are repeated.

As a result of the comparison in the second round of step S308, when the insertion time TI is not greater than the threshold (No in S308), the diagnostic unit 86 determines that the ignition device 50 has no abnormality (S309), and the process proceeds to next step S314. On the other hand, as the result of the comparison in the second round of step S308, when the insertion time TI is greater than the threshold (Yes in S308 and NO in S310), the diagnostic unit 86 determines that the ignition device 50 has the abnormality (S312), and the process proceeds to next step S314.

In step S314, as with step S114 in FIG. 5, the output unit 88 outputs the results obtained in steps S308 to S312 (S314). When it is determined in steps S308 to S312 that the ignition device 50 has the abnormality, the output unit 88 may output the alarm in step S314.

When it is determined, by performing the above-described procedure, that the ignition device 50 has no abnormality (step S309), the startup of the gas turbine 1 is completed. On the other hand, when it is determined, by performing the above-described procedure, that the ignition device 50 has the abnormality (step S312), the starting procedure for the gas turbine 1 is stopped to check the ignition device 50, and the starting procedure for the gas turbine 1 is restarted after the abnormality in the ignition device is removed.

Even if the ignition plug 52 does not operate properly, the ignition plug 52 may operate properly by trying the same operation again. In this respect, according to the embodiment shown in FIG. 8, even if it is once determined that the ignition device 50 has the abnormality, since the abnormality in the ignition device 50 is diagnosed again by using the detection result by the sensor 70, it is possible to reduce the number of times the startup of the gas turbine is stopped or the stop time associated with the abnormality determination of the ignition device 50.

The contents described in the above embodiments would be understood as follows, for instance.

(1) An abnormality detection system (100) for a combustor (4) for a gas turbine (1) according to at least one embodiment of the present invention, includes: a sensor (70) for detecting whether an ignition plug (52) is located at an insertion position (102) in a combustion tube (40) of the combustor for the gas turbine, the ignition plug being disposed movably between the insertion position and a retracted position (101) retracted from the combustion tube; and a diagnostic unit (86) configured to diagnose an abnormality in an ignition device (50) including the ignition plug, based on a detection result by the sensor.

With the above configuration (1), since the sensor can detect whether the ignition plug is located at the insertion position in the combustion tube, the abnormality in the ignition device can appropriately be diagnosed based on the detection result. Therefore, even if the abnormality in the ignition device is detected, the abnormality can be addressed during or before the gas turbine is started, making it possible to quickly start the gas turbine.

(2) In some embodiments, in the above configuration (1), the abnormality detection system includes an insertion time calculation unit (84) configured to calculate an insertion time from a start of insertion of the ignition plug located at the retracted position until the ignition plug reaches the insertion position, based on the detection result by the sensor. The diagnostic unit is configured to diagnose the abnormality in the ignition device based on the insertion time.

According to the findings of the present inventors, when the abnormality occurs in the ignition device including the ignition plug, the insertion time from the start of the insertion of the ignition plug to the completion of the insertion tends to increase. With the above configuration (2), since the insertion time from the start of the insertion of the ignition plug to the completion of the insertion is calculated based on the detection result by the sensor, it is possible to appropriately detect the abnormality in the ignition device based on the calculated insertion time.

(3) In some embodiments, in the above configuration (2), the diagnostic unit is configured to determine that the ignition device has the abnormality when the insertion time is greater than a threshold.

With the above configuration (3), it is possible to appropriately detect the abnormality in the ignition device based on the comparison between the insertion time calculated from the detection result by the sensor and the threshold.

(4) In some embodiments, in the above configuration (1), the abnormality detection system includes an insertion amount calculation unit (84) configured to calculate an insertion amount of the ignition plug based on the detection result by the sensor. The diagnostic unit is configured to diagnose the abnormality in the ignition device based on the insertion amount.

According to the findings of the present inventors, when the abnormality occurs in the ignition device including the ignition plug, the insertion amount from the start of the insertion of the ignition plug to the completion of the insertion tends to decrease. With the above configuration (4), since the insertion amount of the ignition plug is calculated based on the detection result by the sensor, it is possible to appropriately detect the abnormality in the ignition device based on the calculated insertion amount.

(5) In some embodiments, in the above configuration (4), the diagnostic unit is configured to determine that the ignition device has the abnormality when the insertion amount is less than a threshold.

With the above configuration (5), it is possible to appropriately detect the abnormality in the ignition device based on the comparison between the insertion amount calculated from the detection result by the sensor and the threshold.

(6) In some embodiments, in any one of the above configurations (1) to (3), the sensor is a sensor capable of only detecting whether the ignition plug is located at the insertion position.

With the above configuration (6), since the sensor capable of only detecting whether the ignition plug is located at the insertion position is used, it is possible to diagnose the abnormality in the ignition device with the relatively simple configuration.

(7) In some embodiments, in any one of the above (1) to (6), the sensor is a sensor capable of detecting a displacement amount of the ignition plug in a moving direction of the ignition plug.

With the above configuration (7), since the sensor capable of detecting the displacement amount of the ignition plug is used, it is possible to quantitatively know the position of the ignition plug. Thus, it is possible to grasp the state of the ignition device in more detail, and it is possible to diagnose the abnormality in the ignition device in more detail.

(8) In some embodiments, in any one of the above (1) to (7), the abnormality detection system includes an output unit (88) configured to output an alarm when the diagnostic unit determines that the ignition device has the abnormality. The diagnostic unit is configured to diagnose the abnormality in the ignition device based on the detection result by the sensor again, after the alarm is output.

Even if the ignition plug does not operate property, the ignition plug may operate properly by trying the same operation again. With the above configuration (8), even if it is once determined that the ignition device has the abnormality, since the abnormality in the ignition device is diagnosed again by using the detection result by the sensor, it is possible to reduce the number of times the startup of the gas turbine is stopped or the stop time associated with the abnormality determination of the ignition device.

(9) In some embodiments, in any one of the above (1) to (8), the diagnostic unit is configured to diagnose the abnormality in the ignition device based on the detection result by the sensor, during startup of the gas turbine including the combustor and before ignition in the combustor.

With the above configuration (9), since the abnormality in the ignition device is diagnosed during the startup of the gas turbine and before the ignition in the combustor, it becomes easier to grasp the cause of the start-up failure when the gas turbine cannot be started. Thus, it is possible to reduce the number of wasteful restarts of the gas turbine associated with the ignition failure.

(10) A combustor (4) for a gas turbine according to at least one embodiment of the present invention, includes: a fuel nozzle (32, 36) for injecting fuel; an ignition device (50) that includes an ignition plug (52) configured to ignite the fuel injected from the fuel nozzle; and the abnormality detection system (100) as defined in any one of the above (1) to (9), configured to diagnose an abnormality in the ignition device.

With the above configuration (10), since the sensor can detect whether the ignition plug is located at the insertion position in the combustion tube, the abnormality in the ignition device can appropriately be diagnosed based on the detection result. Therefore, even if the abnormality in the ignition device is detected, the abnormality can be addressed during or before the gas turbine is started, making it possible to quickly start the gas turbine.

(11) A gas turbine (1) according to at least one embodiment of the present invention, includes the combustor (4) as defined in the above (10), and a turbine (6) configured to be driven by a combustion gas generated in the combustor.

With the above configuration (11), since the sensor can detect whether the ignition plug is located at the insertion position in the combustion tube, the abnormality in the ignition device can appropriately be diagnosed based on the detection result. Therefore, even if the abnormality in the ignition device is detected, the abnormality can be addressed during or before the gas turbine is started, making it possible to quickly start the gas turbine.

(12) An abnormality detection method for a combustor for a gas turbine according to at least one embodiment of the present invention, includes: a detection step (S104, S204, S304) of detecting whether an ignition plug is located at an insertion position in a combustion tube of the combustor for the gas turbine, the ignition plug being disposed movably between the insertion position and a retracted position retracted from the combustion tube; and a step (S108 to S110, S208 to S210, S308 to S312) of diagnosing an abnormality in an ignition device including the ignition plug, based on a detection result in the detection step.

With the above method (12), since whether the ignition plug is located at the insertion position in the combustion tube is detected, the abnormality in the ignition device can appropriately be diagnosed based on the detection result. Therefore, even if the abnormality in the ignition device is detected, the abnormality can be addressed during or before the gas turbine is started, making it possible to quickly start the gas turbine.

Embodiments of the present invention were described in detail above, but the present invention is not limited thereto, and also includes an embodiment obtained by modifying the above-described embodiments and an embodiment obtained by combining these embodiments as appropriate.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "including" or "having" one constitutional element is not an exclusive expression that excludes the presence of other constitutional elements.

REFERENCE SIGNS LIST

1 Gas turbine
2 Compressor
4 Combustor
6 Turbine
8 Rotor
10 Compressor casing
12 Air inlet
16 Stator vane
18 Rotor blade
20 Casing
22 Turbine casing
24 Stator vane
26 Rotor blade
28 Combustion gas passage
30 Exhaust hood
32 First nozzle
34 Swirler
36 Second nozzle
38 Swirler
40 Combustion tube
50 Ignition device
52 Ignition plug
52a Leading end portion
53 Drive part
54 Piston
56 Rod
58 Cylinder
59 Biasing member
60 First chamber
62 Second chamber
66 Mounting part
68 Movable part
70 Sensor
72 Air source
74 Air line
76 Air valve
78 Control unit
80 Diagnostic device
82 Insertion time calculation unit
84 Insertion amount calculation unit
86 Diagnostic unit
88 Output unit
100 Abnormality detection system
101 Retracted position
102 Insertion position
C Rotor axis

The invention claimed is:

1. An abnormality detection system for a combustor for a gas turbine, the abnormality detection system comprising:
a sensor for detecting whether an ignition plug is located at an insertion position in a combustion tube of the combustor, the ignition plug being disposed movably between the insertion position and a retracted position retracted from the combustion tube; and
a diagnostic unit configured to diagnose an abnormality in an ignition device including the ignition plug, based on a detection result by the sensor,
wherein:

14 the ignition plug is configured to be moved between the insertion position and the retracted position along an axial direction of the ignition plug by a drive part including a cylinder extending along the axial direction and a piston which is slidable along the axial direction in the cylinder; and
the sensor is mounted on the cylinder and disposed to face, in the axial direction, a movable part which is mounted on a rod connected to the piston on a side opposite to the ignition plug.

2. The abnormality detection system according to claim 1, wherein the sensor is capable of only detecting whether the ignition plug is located at the insertion position.

3. The abnormality detection system according to claim 1, wherein the sensor is capable of detecting a displacement amount of the ignition plug in a moving direction of the ignition plug.

4. An abnormality detection method for a combustor for a gas turbine, using the abnormality detection system according to claim 1, the abnormality detection method comprising:
detecting, using the sensor, whether the ignition plug is located at the insertion position in the combustion tube; and
diagnosing the abnormality in the ignition device, based on the detection result by the sensor.

5. A combustor for a gas turbine, the combustor comprising:
a fuel nozzle for injecting fuel;
an ignition device that includes an ignition plug configured to ignite the fuel; and
the abnormality detection system according to claim 1.

6. A gas turbine, comprising:
the combustor according to claim 5; and
a turbine section configured to be driven by a combustion gas generated in the combustor.

7. An abnormality detection system for a combustor for a gas turbine, the abnormality detection system comprising:
a sensor for detecting whether an ignition plug is located at an insertion position in a combustion tube of the combustor, the ignition plug being disposed movably between the insertion position and a retracted position retracted from the combustion tube;
a diagnostic unit configured to diagnose an abnormality in an ignition device including the ignition plug, based on a detection result by the sensor; and
an insertion time calculation unit configured to calculate an insertion time from a start of insertion of the ignition plug located at the retracted position until the ignition plug reaches the insertion position, based on the detection result by the sensor,
wherein the diagnostic unit is configured to diagnose the abnormality in the ignition device based on the insertion time.

8. The abnormality detection system according to claim 7, wherein the diagnostic unit is configured to determine that the ignition device has the abnormality when the insertion time is greater than a threshold.

9. An abnormality detection method for a combustor for a gas turbine using the abnormality detection system according to claim 7, the abnormality detection method comprising:
detecting, using the sensor, whether the ignition plug is located at the insertion position in the combustion tube; and
diagnosing the abnormality in the ignition device, based on the detection result by the sensor.

10. A combustor for a gas turbine, the combustor comprising:

a fuel nozzle for injecting fuel;

an ignition device that includes an ignition plug configured to ignite the fuel; and the abnormality detection system according to claim 7.

11. A gas turbine, comprising:

the combustor according to claim 10; and a turbine section configured to be driven by a combustion gas generated in the combustor.

12. An abnormality detection system for a combustor for a gas turbine, the abnormality detection system comprising:

a sensor for detecting whether an ignition plug is located at an insertion position in a combustion tube of the combustor, the ignition plug being disposed movably between the insertion position and a retracted position retracted from the combustion tube;

a diagnostic unit configured to diagnose an abnormality in an ignition device including the ignition plug, based on a detection result by the sensor; and an insertion distance calculation unit configured to calculate an insertion distance of the ignition plug based on the detection result by the sensor, wherein the diagnostic unit is configured to diagnose the abnormality in the ignition device based on the insertion distance.

13. The abnormality detection system according to claim 12, wherein the diagnostic unit is configured to determine that the ignition device has the abnormality when the insertion distance is less than a threshold.

14. An abnormality detection method for a combustor for a gas turbine using the abnormality detection system according to claim 12, the abnormality detection method comprising:

detecting, using the sensor, whether the ignition plug is located at the insertion position in the combustion tube; and diagnosing the abnormality in the ignition device, based on the detection result by the sensor.

15. A combustor for a gas turbine, the combustor comprising:

a fuel nozzle for injecting fuel;

an ignition device that includes an ignition plug configured to ignite the fuel; and the abnormality detection system according to claim 12.

16. A gas turbine, comprising:

the combustor according to claim 15; and a turbine section configured to be driven by a combustion gas generated in the combustor.

17. An abnormality detection system for a combustor for a gas turbine, the abnormality detection system comprising:

a sensor for detecting whether an ignition plug is located at an insertion position in a combustion tube of the combustor, the ignition plug being disposed movably between the insertion position and a retracted position retracted from the combustion tube;

a diagnostic unit configured to diagnose an abnormality in an ignition device including the ignition plug, based on a detection result by the sensor; and an output unit configured to output an alarm when the diagnostic unit determines that the ignition device has the abnormality, wherein the diagnostic unit is configured to diagnose the abnormality in the ignition device based on the detection result by the sensor again, after the alarm is output.

18. An abnormality detection method for a combustor for a gas turbine using the abnormality detection system according to claim 17, the abnormality detection method comprising:

detecting, using the sensor, whether the ignition plug is located at the insertion position in the combustion tube; and diagnosing the abnormality in the ignition device, based on the detection result by the sensor.

19. A combustor for a gas turbine, the combustor comprising:

a fuel nozzle for injecting fuel;

an ignition device that includes an ignition plug configured to ignite the fuel; and the abnormality detection system according to claim 17.

20. A gas turbine, comprising:

the combustor according to claim 19; and a turbine section configured to be driven by a combustion gas generated in the combustor.

21. An abnormality detection system for a combustor for a gas turbine, the abnormality detection system comprising:

a sensor for detecting whether an ignition plug is located at an insertion position in a combustion tube of the combustor, the ignition plug being disposed movably between the insertion position and a retracted position retracted from the combustion tube; and a diagnostic unit configured to diagnose an abnormality in an ignition device including the ignition plug, based on a detection result by the sensor, wherein the diagnostic unit is configured to diagnose the abnormality in the ignition device based on the detection result by the sensor, during startup of the gas turbine and before ignition in the combustor.

22. An abnormality detection method for a combustor for a gas turbine using the abnormality detection system according to claim 21, the abnormality detection method comprising:

detecting, using the sensor, whether the ignition plug is located at the insertion position in the combustion tube; and diagnosing the abnormality in the ignition device, based on the detection result by the sensor.

23. A combustor for a gas turbine, the combustor comprising:

a fuel nozzle for injecting fuel;

an ignition device that includes an ignition plug configured to ignite the fuel; and the abnormality detection system according to claim 21.

24. A gas turbine, comprising:

the combustor according to claim 23; and a turbine section configured to be driven by a combustion gas generated in the combustor.

* * * * *